United States Patent
Hwang

(10) Patent No.: US 11,333,333 B1
(45) Date of Patent: May 17, 2022

(54) OUTDOOR SOLAR GROUND LIGHT

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 17/396,756

(22) Filed: Aug. 8, 2021

(51) Int. Cl.
| | |
|---|---|
| *F21V 21/08* | (2006.01) |
| *F21S 9/03* | (2006.01) |
| *F21V 31/00* | (2006.01) |
| *F21V 23/04* | (2006.01) |
| *F21S 8/08* | (2006.01) |
| *F21Y 115/10* | (2016.01) |

(52) U.S. Cl.
CPC .......... *F21V 21/0824* (2013.01); *F21S 8/081* (2013.01); *F21S 9/037* (2013.01); *F21V 23/04* (2013.01); *F21V 31/005* (2013.01); *F21Y 2115/10* (2016.08)

(58) Field of Classification Search
CPC ........ F21S 9/037; F21S 8/081; F21V 21/0824
See application file for complete search history.

(56) References Cited

U.S. PATENT DOCUMENTS

| | | | | |
|---|---|---|---|---|
| 5,062,028 | A | * | 10/1991 | Frost ................. F21V 21/0824 362/183 |
| 5,367,442 | A | * | 11/1994 | Frost ..................... F21S 8/081 136/291 |
| D822,253 | S | * | 7/2018 | Wu ............................. D26/68 |
| D864,452 | S | * | 10/2019 | Wei ............................ D26/67 |
| D866,839 | S | * | 11/2019 | Yan ............................ D26/67 |
| 10,619,810 | B1 | | 4/2020 | Hwang |
| 10,995,918 | B1 | | 5/2021 | Hwang |
| 11,002,418 | B1 | * | 5/2021 | Hollinger .............. F21V 23/04 |
| 2003/0137831 | A1 | * | 7/2003 | Lin ....................... F21S 8/022 362/183 |
| 2011/0310597 | A1 | * | 12/2011 | Lu ......................... F21V 5/002 362/183 |
| 2014/0218900 | A1 | * | 8/2014 | Adair .................... F21S 8/022 362/183 |
| 2019/0128486 | A1 | * | 5/2019 | Hollinger .............. F21S 9/037 |

* cited by examiner

*Primary Examiner* — William N Harris

(57) ABSTRACT

An outdoor solar ground light includes a primary light board and a plurality of secondary light boards installed in the outdoor solar ground light and electrically connected with each other without requiring the use of a conductive wire, and capable of emitting light around the top and the sides of the ground light simultaneously, and the ground light adopts a light emitting diode such as a white/warm white LED or a RGB LED provided for users to select their favorite color or change the color cyclically. Unlike the commercial available ground light, the present invention has the advantages of simple assembling, easy use, convenient transportation and packaging, and aesthetic merchandise appearance.

11 Claims, 5 Drawing Sheets

OUTDOOR SOLAR GROUND LIGHT

FIELD OF INVENTION

The present invention relates to an outdoor solar ground light, in particular to a lamp which can be plugged into an outdoor ground or fixed to any plane and has a built-in solar panel capable of emitting light around the top and the side of the lamp without requiring any external power supply.

BACKGROUND OF INVENTION

Description of the Related Art

Outdoor lights are often used in gardens, homes, open-air restaurants or outdoor leisure venues to provide moderate lighting and create an atmosphere and decorate the surrounding environment. For example, a substantially dish-shaped ground light commercially available on the market is buried in the ground and capable of emitting light from the top, the side or the bevel of the ground light, but so far there is no ground light product capable of emitting light from both of the top and side. To take the convenience of installation and maintenance into account, most of the present existing garden lights or ground lights are equipped with a solar panel and a battery, and solar energy is used as a supply of the operating power, while achieving effects of environmental protection and energy saving.

The structure of the aforementioned ground light comprises a lamp cover, a frame mounted onto the exterior of the translucent lamp cover, a base combined with the bottom of the lamp cover, and a light board installed between the lamp cover and the base, and the top of the light board has a solar panel and a plurality of LEDs, and the underside of the light board has a battery. The bottom of the base has a ground plug pluggable and fixable into an outdoor ground. During daytime, the solar panel receives solar energy and converts the solar energy into electrical energy to be stored in the battery. During nighttime, the battery supplies the electrical energy required by the plurality of LEDs, so that the lights emitted from the plurality of LEDs can be transmitted to the outside from the top of the lamp cover.

Based on the structure above, the inventor of the present invention has designed a ground light as disclosed in U.S. Pat. Nos. 10,619,810B1 and 10,995,918B1 and the aim of these patents is to strengthen a waterproof design and provide a modular design of components to overcome the drawbacks of the traditional ground light, and to achieve the effects of lowering the cost, improving the safety and providing the multi-functions of the ground light to be used in the grassland of a backyard oasis, a deck or a patio, etc.

The inventor of the present invention further conducted extensive research and experiment on the function of the ground light products and found that the conventional ground light can only transmit lights upward due to the high directivity of the LED light source and the limitation of installing the LED onto the top of a circuit only, and other conventional ground lights adopt an oblique light emission method with the disadvantages of low intensity and large volume which are not conducive to packaging and transportation, and the large volume also incurs a higher transportation cost. Therefore, it is a main subject of the present invention to differentiate the product of the invention from other products and improve the side lighting effect of the ground light while maintaining the periphery of the ground light in a right angle to facilitate packaging.

SUMMARY OF THE INVENTION

Specifically, the present invention discloses an outdoor solar ground light, comprising: a base having a set of positioning components at the bottom thereof, a translucent lamp cover covering on the base, a frame mounted onto the exterior of the translucent lamp cover, and a primary light board installed between the translucent lamp cover and the base, wherein the translucent lamp cover comprises a top translucent portion and a side translucent portion extending downwardly from the periphery of the top translucent portion, and the primary light board has a top disposed under the top translucent portion and an underside opposite to the top, and a solar panel is installed at the center of the top of the primary light board, and a plurality of LEDs is installed around the solar panel, and a battery is installed at the center of the underside of the primary light board and electrically coupled to the solar panel and the plurality of LEDs, characterized in that the base has a top, the a plurality of support columns extending upwardly from the top of the base for supporting the underside of the primary light board, so that a fixed spacing is formed between the underside of the primary light board and the top of the base and provided for the underside of the primary light board to install a plurality of secondary light boards around an outer side of the battery; and each secondary light board is installed in a substantially perpendicular direction to the underside of the primary light board and has an outer side facing the side translucent portion, and a plurality of LEDs installed on the outer side of the secondary light board and electrically coupled to the battery, and when the primary light board and the secondary light board emit light, the lights emitted by the primary and secondary light boards are passed through the top translucent portion and the side translucent portion of the translucent lamp cover and scattered towards the top and the surrounding respectively.

Compared to the prior art, a general ground light can only emit light from the top, the side or the bevel of the ground light, but the ground light of the present invention uses the plurality of support columns to provide a fixed spacing between the underside of the primary light board and the base, so that the periphery of the bottom of the primary light board has space for installing the plurality of secondary light boards configured to be substantially vertical and capable of emitting light towards the outer side. When both of the primary light board and the secondary light board emit lights, the lights can be passed through the top translucent portion and the side translucent portion of the translucent lamp cover and scattered around, so as to further improve the side lighting effect while maintaining the top lighting effect of the ground light.

It is noteworthy that the light source of LEDs has a high directivity. Although the conventional ground lights can illuminate the outside surrounding area in an oblique direction by a light guide method to the tight, both of the top and the side have insufficient light intensity, and the volume of the ground lights will be larger since a bevel will be formed around the whole ground lights, and thus incurring a higher transportation cost. Especially in the era of high transportation cost, the increase in transportation cost means the decrease in market competitiveness. On the other hand, the present invention installs the plurality of secondary light boards in a direction substantially perpendicular to the underside of the primary light board, so that the primary light board can emit light at the top, while the plurality of secondary light boards can emit light on the side. The invention not just provides a more direct and balanced lighting effect only, but also maintains the top of the lamp cover at a right angle with the surrounding and overcomes the packaging and transportation costs of the prior art, so as to control the cost effectively.

The present invention will become clearer in light of the following detailed description of an illustrative embodiment of this invention described in connection with the drawings.

DESCRIPTION OF THE PREFERRED EMBODIMENTS

Figure 1:
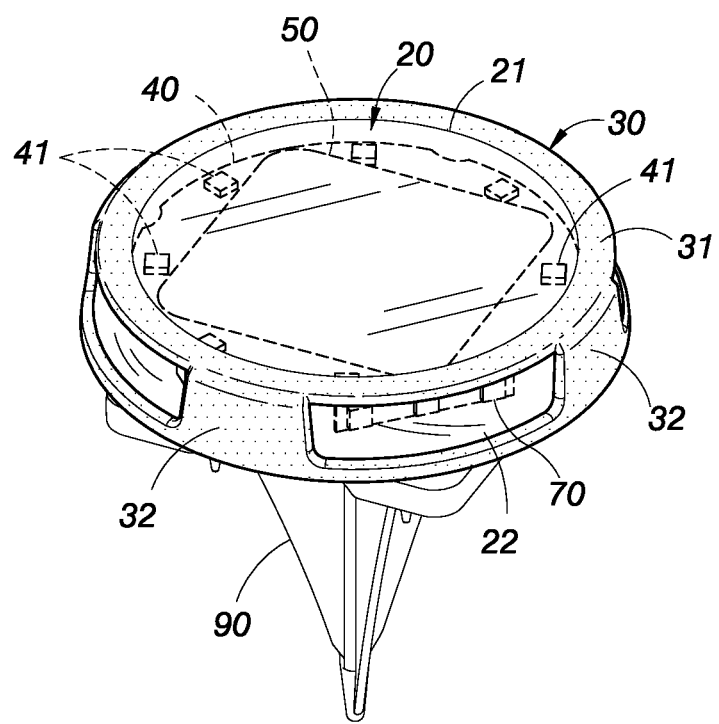
FIG. 1 is a perspective view of the present invention.
Figure 2:
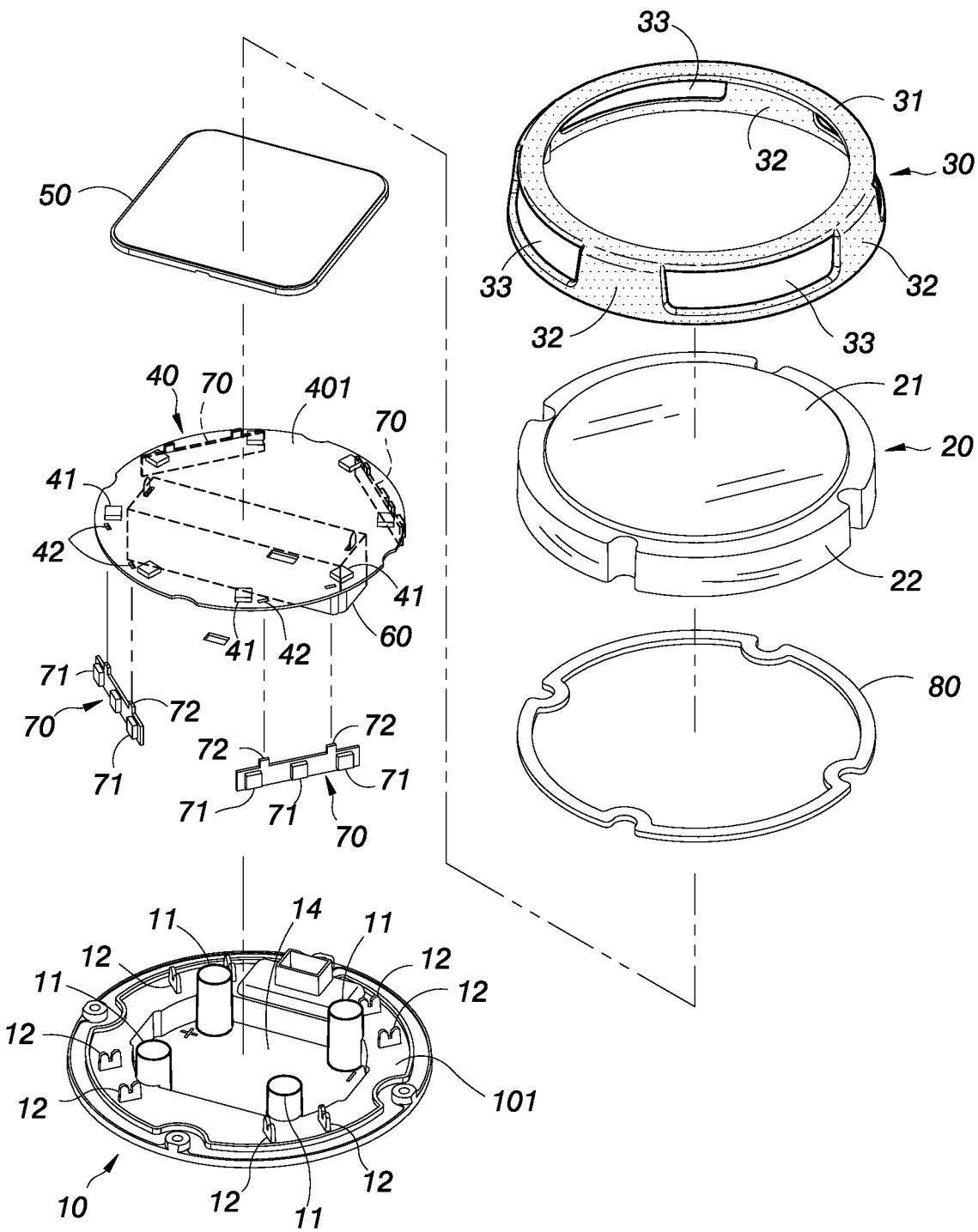
FIG. 2 is an exploded view of the present invention.
Figure 3:
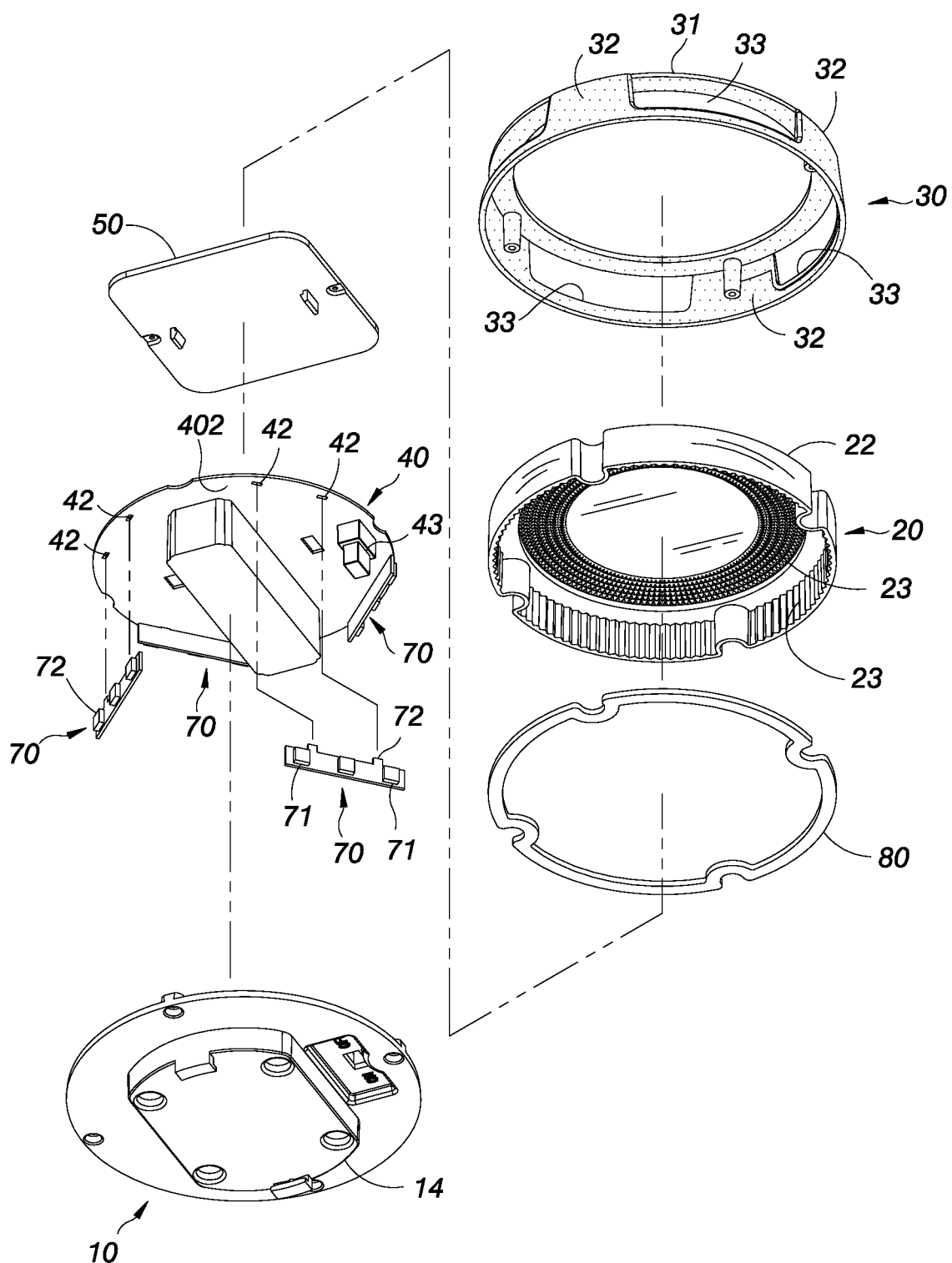
FIG. 3 is another exploded view of the present invention.
Figure 4:
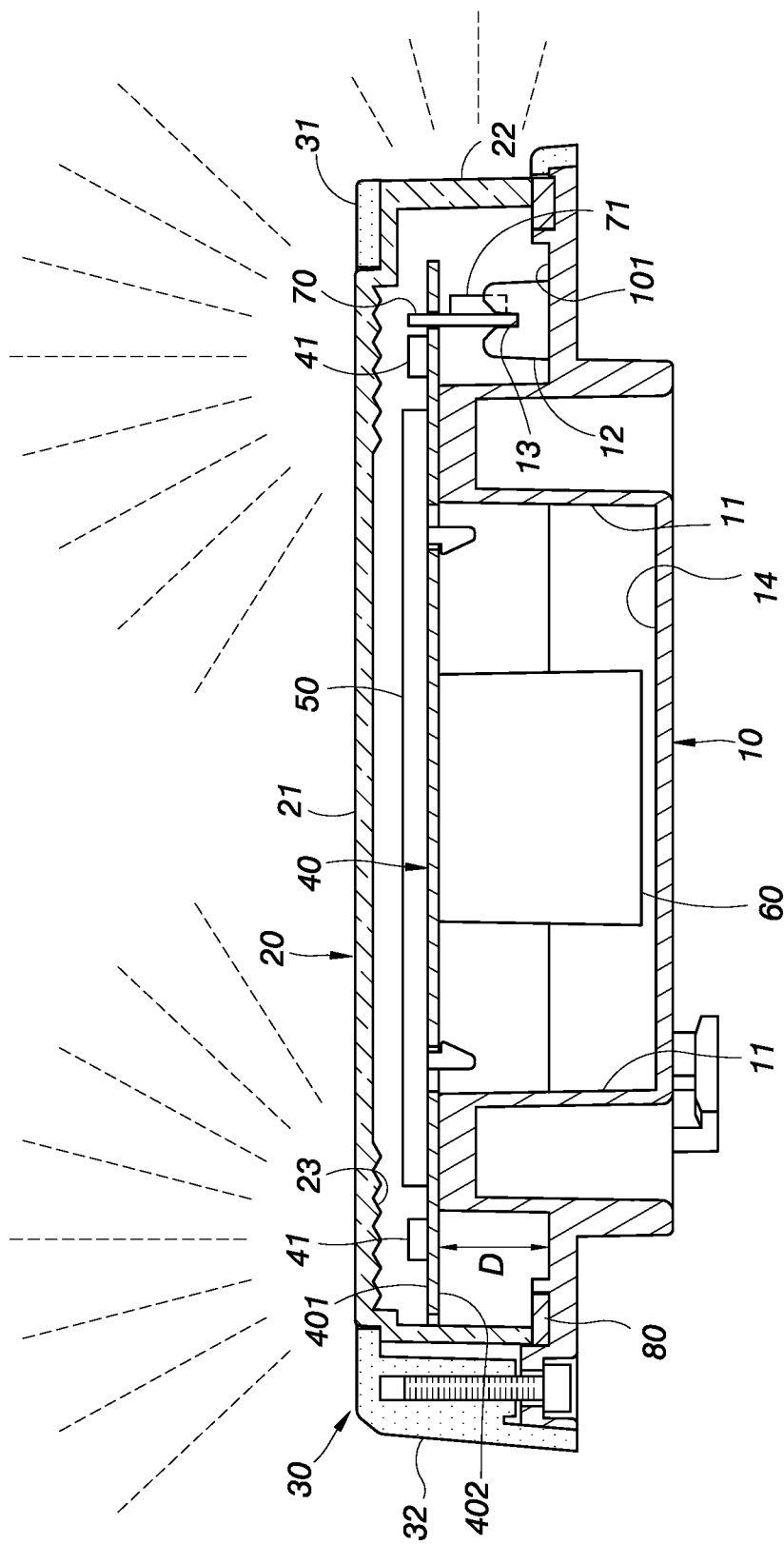
FIG. 4 is a cross-sectional side view of the present invention.

With reference to FIGS. 1 to 4 for an outdoor solar ground light of the present invention, the outdoor solar ground light comprises a base 10, a translucent lamp cover 20 covering on the base 10, a frame 30 mounted onto the exterior of the translucent lamp cover 20, and a primary light board 40 installed between the translucent lamp cover 20 and the base 10.

The translucent lamp cover 20 comprises a top translucent portion 21, and a side translucent portion 22 extending downwardly from the periphery of the top translucent portion 21. In an embodiment, the side translucent portion 22 is substantially perpendicular to the top translucent portion 21 and arranged substantially in a ring shape around the bottom of the periphery of the top translucent portion 21.

the primary light board 40 has a top 401 disposed under the top translucent portion 21 and an underside 402 configured to be opposite to the top 401, and comprises a solar panel 50 installed at the center of the primary light board 40, and a plurality of LEDs 41 installed around the solar panel 50. A battery 60 is installed at the center of the underside 402 of the primary light board 40, and the battery 60, the solar panel 50, and the plurality of LEDs 41 are electrically coupled to one another through the primary light board 40.

The base 10 has a top 101, and a plurality of support columns 11 extending upwardly from the top 101 of the base 10, and the top ends of the plurality of support columns 11 support the underside 402 of the primary light board 40, and a fixed spacing D is formed between the underside 402 of the primary light board 40 and the top 101 of the base 10, and the space of the fixed spacing D is provided for the underside 402 of the primary light board 40 to install the plurality of secondary light boards 70, and the secondary light boards 70 are disposed around the outer side of the battery 60.

Each secondary light board 70 is installed in a direction substantially perpendicular to the underside 402 of the primary light board 40, and faces towards the outer side of the side translucent portion 22, and the outer side of the secondary light board 70 has a plurality of LEDs 71, and the top of each secondary light board 70 has a set of pins 72, and the primary light board 40 has a plurality of insert holes 42 formed around the underside 402 of the primary light board 40 for embedding and fixing the pin 72 of each secondary light board 70 from bottom to top, and then the primary light board 40 is electrically coupled to the battery 60, and each secondary light board 70 is perpendicular to the primary light board 40.

The advantage of embedding and fixing the primary light board 40 and the secondary light board 70 by using the insert holes 42 and the pins 72 is that the primary light board 40 and the secondary light board 70 only need to reserve a solder pad between them on the circuit, and the electrical connection can be completed by direct soldering, or the insert holes 42 and pins 72 can be designed to be directly inserted into the electrical connector structure. The connection is fixed, so that there is no need to have a conductive wire between the primary light board 40 and the secondary light board 70, which can reduce the manufacturing labor and time and avoid the soldering of conductive wires which may cause tangled conductive wire, increased occupying space, and difficult assembling.

In an embodiment, the insert holes 42 are formed on the underside 402 and at positions other than those for installing the LEDs 41 of the top 401 to avoid possible interference between the pin 72 of the secondary light board 70 and the LED 41. When the LED 41 of the primary light board 40 and the LED 71 of the secondary light board 70 emit lights, the lights are passed upwardly through the top translucent portion 21 and the side translucent portion 22 of the translucent lamp cover 20 and scattered around to improve the side lighting effect.

In an embodiment, the inner sides of the top translucent portion 21 and the side translucent portion 22 of the translucent lamp cover 20 has a plurality of densely distributed concave-and-convex patterns 23 which allow the lights emitted by the plurality of LEDs 41, 71 to pass through and scatter uniformly, and the plurality of LEDs 41, 71 are white/warm white LEDs, or RGB LEDs with a color change function.

In addition, the underside 402 of the primary light board 40 as shown in the figure has a switch 43 provided for a user to press or toggle in order to switch the lighting effect of the LED 41 of primary light board 40 and the LED 71 of the secondary light board 70. For example, in the RGB LED, the switch 43 is set to have four-stage switching, pressing, or toggling and can be switched to White Light, Off, RGB Color Change, and Color Lock sequentially. The user can press the switch 43 to let the LEDs 41, 71 emit white light, and then the user releases the switch 43 to maintain the constantly lit white light. If the user presses the RGB Color Change function to change the color of the light to the desired color, the user may press the switch 43 once to execute the Color Lock function, so as to lock the color of the light and provide the user to have more options on the lighting effect.

It is noteworthy that the aforementioned embodiment is different those conventional ground light available on the market and only having the RGB Color Change function, but not having the Color Lock function or the White Light function. In the product of the present invention, users can select the function of White Light or RGB Color Change, and the users can even use the switch 43 to select their favorite color and then lock the color in the RGB Color Change process. In addition, this color selection function can also be used in line with the display of a store, and the store only needs to select a product to sell in order to meet all the needs of the user, and there is no need to increase the shelf space to display a variety of products with different products of a single function on the shelf, and this arrangement can increase the space utilization of the store.

In addition, the secondary light boards 70 are embedded and fixed to the underside 402 of primary light board 40 in a direction from bottom to up to avoid the secondary light boards 70 from being shaken or falling down, and the top 101 of the base 10 has a plurality of fixed plates 12 erected from the bottom of each secondary light board 70, and the top of each fixed plate 12 has a notch 13 provided for embedding and positioning the bottom of the secondary light board 70, so that each secondary light board 70 can be vertically clamped and fixed between the fixed plate 12 and the underside 402 of the primary light board 40.

In an embodiment, the frame 30 is provided for protecting the translucent lamp cover 20 to prevent the translucent lamp cover 20 from being collided or damaged. The frame 30 has a ring-shaped protective edge 31 disposed at an external intersection of the top translucent portion 21 and the side translucent portion 22 of the translucent lamp cover 20.

In line with the substantially perpendicular design of the side translucent portion 22 and the top translucent portion 21 of the translucent lamp cover 20, the ring-shaped protective edge 31 has a plurality of protective plates 32 extending vertically downward from the periphery of the ring-shaped protective edge 31, so that each protective plate 32 can be stacked on the outer side of the side translucent portion 22 of the translucent lamp cover 20, and a side hollow portion 33 is formed between two adjacent protective plates 32, and each side hollow portion 33 is disposed on a corresponding outer side of each respective secondary light board 70, so that the light emitted from the secondary light board 70 can be scattered to the outside from the side hollow portion 33.

During assembling, both of the battery 60 and the secondary light board 70 are disposed on the underside 402 of the primary light board 40, so that the fixed spacing D between the primary light board 40 and the base 10 must be slightly larger than or equal to the height of the secondary light board 70, and the center of the top 101 of the base 10 has a receiving groove 14 configured to be opposite to the battery 60. If the height of the secondary light board 70 and the distance of the fixed spacing D are smaller than the thickness of the battery 60, the receiving groove 14 can accommodate the embedded bottom of the battery 60. Of course, the receiving groove 14 is not a necessary structure. If the fixed spacing D is greater than the thickness of the battery 60, the design of the receiving groove 14 will not be needed.

In addition, a waterproof gasket 80 is installed between the bottom of the side translucent portion 22 of the translucent lamp cover 20 and the periphery of the top 101 of the base 10 and provided for sealing the translucent lamp cover 20 and the base 10 to prevent external moisture from entering into the translucent lamp cover 20, so as to prevent damages to the primary light board 40, the secondary light board 70, and other electronic components.

Figure 5:
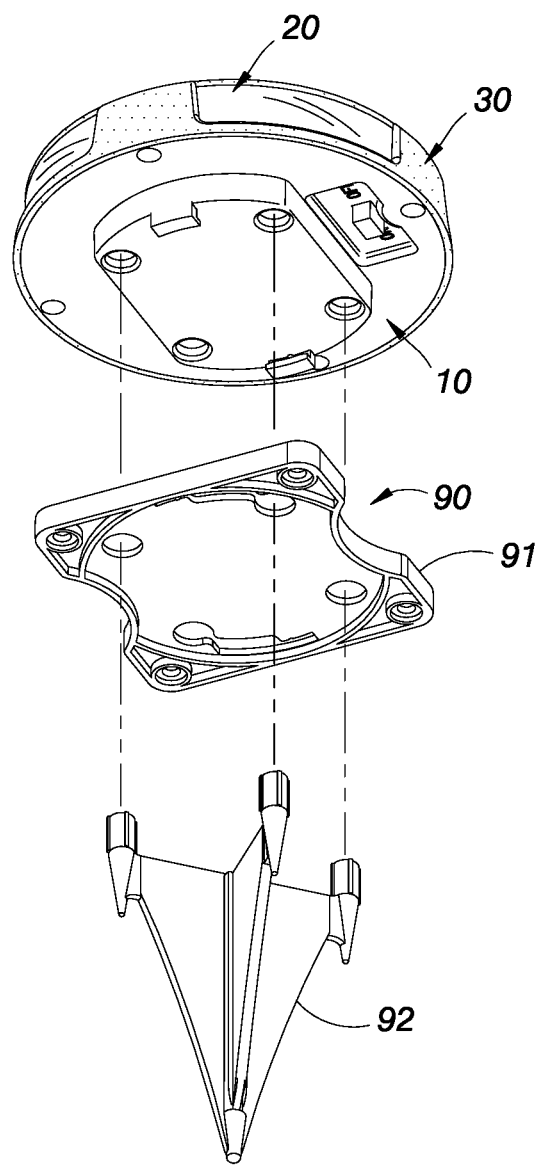
FIG. 5 is an exploded view of the present invention and a positioning component.

In an embodiment as shown in FIG. 5, a set of positioning components 90 are installed on the bottom of the base 10, and the set of positioning components 90 comprise a positioning plate 91 and a plug 92, and users may fix the outdoor solar ground light to a wall or any plane through the positioning plate 91 or may plug the outdoor solar ground light into ground soil through the plug 92 if necessary.

Compared to the prior art, the present invention as shown in FIG. 1-4 has the plurality of support columns 11 to provide the fixed spacing D between the underside 402 of the primary light board 40 and the base 10, so that the periphery of the bottom of the primary light board 40 has space for installing the plurality of secondary light boards 70 capable of emitting lights in a direction towards the outer side. When the primary light board 40 and secondary light board 70 emit lights, the lights can be passed through the top translucent portion 21 and the side translucent portion 22 of the translucent lamp cover 20 and scattered around to improve the side lighting effect.

In addition, the secondary light boards 70 are installed substantially perpendicular to the underside 402 of the primary light board 40, so that the top translucent portion 21 and the surrounding side translucent portion 22 of the translucent lamp cover 20 can be maintained at a substantially right angle to achieve a more balanced top and side lighting effect and overcome the packaging and transportation problems of the prior art. In another embodiment, the primary light board 40 and the secondary light board 70 uses the method of embedding and fixing the insert hole 42 with the pin 72 to directly solder a circuit between the two boards or uses the electrical connection of an electrical connector without requiring the use of any conductive wire to avoid the problems of a tangled conductive wire, a large occupying space, and a difficult assembling process.

While the invention has been described by means of specific embodiments, numerous modifications and variations could be made thereto by those skilled in the art without departing from the scope and spirit of the invention set forth in the claims.

What is claimed is:

1. An outdoor solar ground light, comprising:
a base having a set of positioning components at a bottom thereof,
a translucent lamp cover covering the base,
a frame mounted onto an exterior of the translucent lamp cover, and
a primary light board installed between the translucent lamp cover and the base,
wherein the translucent lamp cover comprises a top translucent portion and a side translucent portion extending downwardly from a periphery of the top translucent portion, and the primary light board has a top disposed under the top translucent portion and an underside opposite to the top, and a solar panel is installed at a center of the top of the primary light board, and a plurality of LEDs are installed around the solar panel, and a battery is installed at a center of the underside of the primary light board and electrically coupled to the solar panel and the plurality of LEDs; and
wherein the base has a top, a plurality of support columns extending upwardly from the top of the base for supporting the underside of the primary light board, so that a fixed spacing is defined between the underside of the primary light board and the top of the base and provided for the underside of the primary light board to install a plurality of secondary light boards around an outer side of the battery; and
each secondary light board is installed in a substantially perpendicular direction to the underside of the primary light board and has an outer side facing the side translucent portion, and a plurality of LEDs installed on an outer side of the secondary light board and electrically coupled to the battery, and when the primary light board and the secondary light board emit light, the light emitted by the primary and secondary light boards passes through the top translucent portion and the side translucent portion of the translucent lamp cover and is scattered towards a top area of the ground light and a surrounding area respectively.

2. The outdoor solar ground light according to claim 1, wherein each secondary light board comprises a set of pins disposed at a top thereof, and the primary light board has a plurality of insert holes formed around the underside thereof and provided for embedding and fixing the pins of each secondary light board therein and electrically coupling to the primary light board without requiring a conductive wire.

3. The outdoor solar ground light according to claim 2, wherein the base has a plurality of fixed plates disposed at the top thereof and erected from a bottom of each secondary light board, and each fixed plate has a notch formed at a top thereof, and each notch is provided for embedding and positioning the bottom of the respective secondary light board, so that each secondary light board is vertically clamped and fixed between the respective fixed plate and the underside of the primary light board.

4. The outdoor solar ground light according to claim 3, wherein the frame comprises a ring-shaped protective edge disposed at an external intersection of the top translucent portion and the side translucent portion of the translucent lamp cover, and a plurality of protective plates extend downwardly from a periphery of the ring-shaped protective edge and are spaced from each other, and each protective plate is stacked on an outer side of the side translucent portion of the translucent lamp cover, so that a side hollow portion is formed between two adjacent protective plates, and each side hollow portion is disposed on a corresponding outer side of the plurality of secondary light boards.

5. The outdoor solar ground light according to claim 4, wherein the side translucent portion is substantially perpendicular to the top translucent portion, and disposed around a bottom of a periphery of the top translucent portion; and each protective plate is substantially perpendicular to the ring-shaped protective edge, so that each protective plate is stackable on an outer side of the side translucent portion of the translucent lamp cover.

6. The outdoor solar ground light according to claim 3, wherein the primary light board further comprises a switch installed on the underside thereof and provided for a user to toggle in order to switch a lighting effect of the primary light board and the secondary light board.

7. The outdoor solar ground light according to claim 6, wherein the plurality of LEDs installed on the primary light board and the secondary light board are white or warm white LEDs, or RGB LEDs, and if the RGB LEDs are selected, the switch is provided for the user to press or toggle and then sequentially switch to White Light, Off, RGB Color Change, or Color Lock.

8. The outdoor solar ground light according to claim 1, wherein the base has a receiving groove formed at a center of the top thereof and provided for embedding a bottom of the battery.

9. The outdoor solar ground light according to claim 1, wherein the top translucent portion and the side translucent portion of the lamp cover have a concave-and-convex pattern distributed on inner sides thereof and provided for scattering the light of the plurality of LEDs.

10. The outdoor solar ground light according to claim 1, further comprising a waterproof gasket installed between a bottom of the side translucent portion of the translucent lamp cover and a periphery of the top of the base and configured to couple the translucent lamp cover with the base.

11. The outdoor solar ground light according to claim 1, wherein the set of positioning components comprises a plug detachably fixed to a positioning plate and pluggable into the ground.

* * * * *